Figure 1:
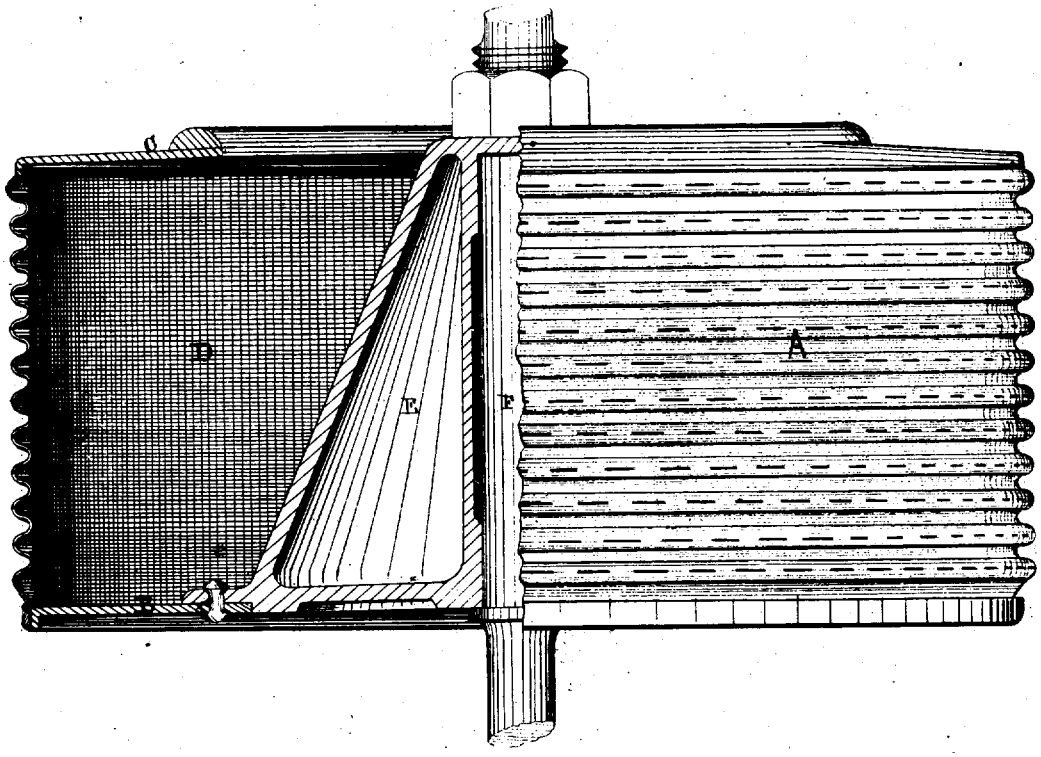

Original Patent Dated March 23 1869

H W & R LAFFERTY

Impd Basket for Centrifugal Machines

4248

REISSUED JAN 31 1871

WITNESSES

E. H. Young
J. M. Burr

Hugh W. Lafferty
Robert Lafferty
Inventors

By David A. Burr
Atty.

UNITED STATES PATENT OFFICE.

HUGH W. LAFFERTY AND ROBERT LAFFERTY, OF GLOUCESTER CITY, N. J.

IMPROVEMENT IN CENTRIFUGAL SUGAR-DRAINING MACHINES.

Specification forming part of Letters Patent No. 88,185, dated March 23, 1869; Reissue No. 4,248, dated January 31, 1871.

DIVISION B.

*To all whom it may concern:*

Be it known that we, HUGH W. LAFFERTY and ROBERT LAFFERTY, of Gloucester City, in the county of Camden and State of New Jersey, have invented a new and Improved Draining Basket or Drum for Centrifugal Draining-Machines, of which the following is a specification.

Our invention relates to the employment of a longitudinally crimped, folded, or corrugated strainer-plate for the outer sides or shell of the cylindrical draining-basket of a centrifugal machine in the place of the flat external plates ordinarily employed for the purpose, the object of our invention being to simplify the construction and reduce the weight of the baskets, and at the same time increase their efficiency.

In the accompanying drawing, consisting of a side elevation of our improved draining-basket, with a portion thereof in vertical section, A is the external plate, which constitutes the sides of the basket or drum; B, the bottom plate, and C the annular rim thereof. The plate A is made of thin sheet metal, crimped or corrugated longitudinally by suitable means, and so arranged and combined with the bottom plate, B, of the basket as that its grooves or corrugations shall run circumferentially or at right angles to the axis of the basket, as shown in the drawings.

D is a lining, of metallic cloth or wire-netting, placed and stretched in the usual manner within the basket, so as to touch and bear against the internally-projecting ridges or arches of the corrugations. The grooves in the corrugations on the inner side of the plate A form a series of narrow circumferential channels between the metallic cloth and the external plate, serving to receive the liquids passing through the meshes of the metallic cloth. These internal grooves are pierced with a series of apertures to permit a free egress and discharge of the sirup or other liquid from the basket, said apertures having, by preference, the form of elongated slits, as illustrated in the drawing. By disposing the corrugations circumferentially instead of transversely, they will retain their form, notwithstanding the rapid revolution of the basket. The discharge of the sirup or other liquid from the basket is greatly facilitated by these grooves or channels, and by piercing the outlet-apertures in the outer curves of the corrugations all tendency to clog up is prevented, so that they will remain always open and unobstructed.

By the use of corrugated plates instead of flat ones, far greater strength is obtained in the construction of the basket, in proportion to the weight of metal employed, than is attainable in any other form thereof.

The annular bottom plate of the basket is, as usual, shrunk upon and secured to a hollow conical center, E, by which it is fixed in the operating-spindle F of the machine.

The external cylindrical corrugated plate A is firmly secured to the outer rim of the bottom plate, B, below and to the annular rim C, in any suitable manner.

It is manifest that the size, form, and proportions of the corrugations may be varied at pleasure without departing from the spirit of our invention.

We claim as our invention—

A corrugated or grooved metallic plate, arranged and combined, substantially as herein described, with suitable top and bottom plates to inclose and to form the sides of the draining-basket of a centrifugal machine, as and for the purpose herein set forth.

As witness our hands.

HUGH W. LAFFERTY.
ROBERT LAFFERTY.

Witnesses:
JOHN GAUNT,
E. W. LAFFERTY.